E. S. BRYANT & E. CEDERSTROM.
REVERSING MECHANISM.
APPLICATION FILED MAR. 15, 1909.

992,157.

Patented May 16, 1911.

3 SHEETS—SHEET 1.

WITNESSES:

INVENTORS
ELLSWORTH S. BRYANT
EMIL CEDERSTROM
BY
ATTORNEYS

THE NORRIS PETERS CO., WASHINGTON, D. C.

E. S. BRYANT & E. CEDERSTROM.
REVERSING MECHANISM.
APPLICATION FILED MAR. 15, 1909.

992,157.

Patented May 16, 1911.

3 SHEETS—SHEET 2.

WITNESSES:

INVENTORS
ELLSWORTH S. BRYANT
EMIL CEDERSTROM
BY
ATTORNEYS

E. S. BRYANT & E. CEDERSTROM.
REVERSING MECHANISM.
APPLICATION FILED MAR. 15, 1909.
992,157.
Patented May 16, 1911.
3 SHEETS—SHEET 3.
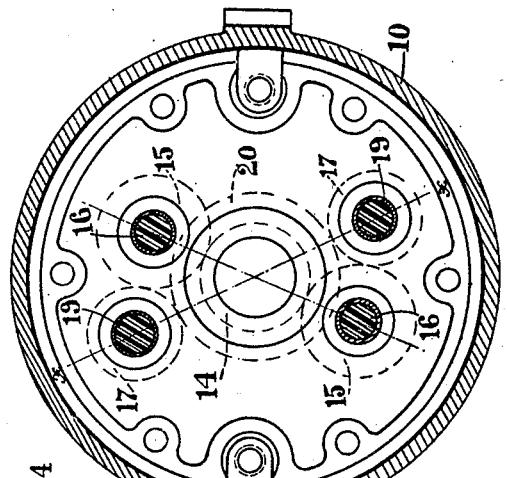
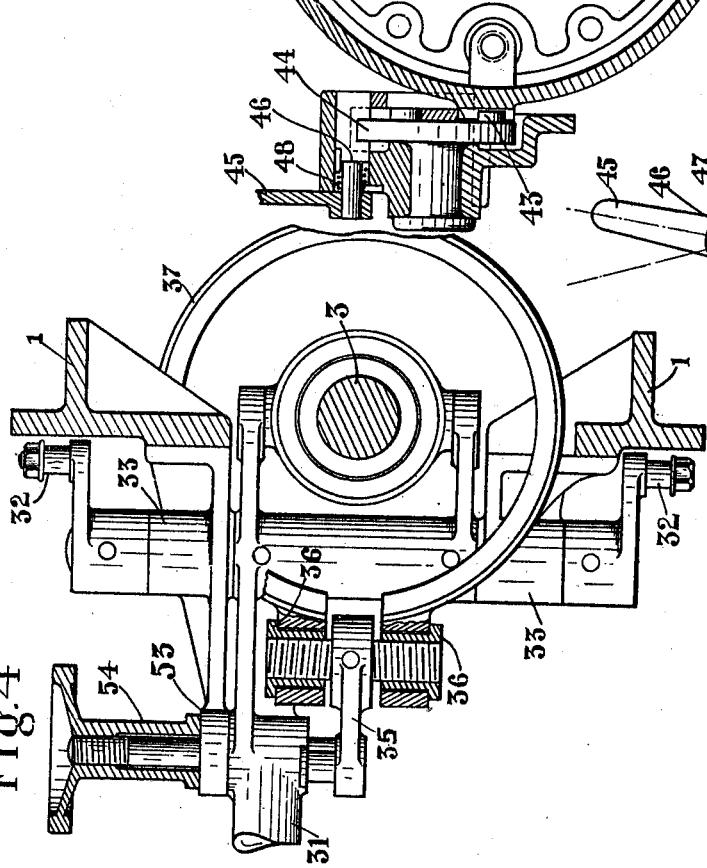
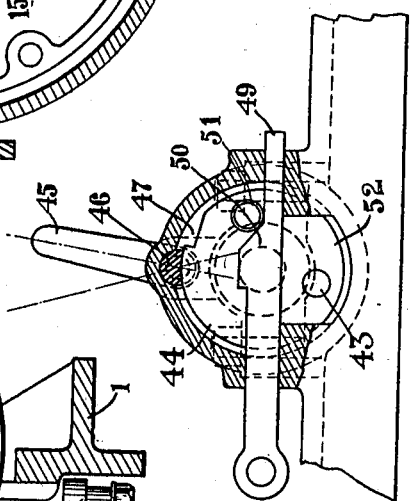
WITNESSES:
INVENTORS
ELLSWORTH S. BRYANT
EMIL CEDERSTROM
BY
ATTORNEYS

UNITED STATES PATENT OFFICE.

ELLSWORTH S. BRYANT AND EMIL CEDERSTROM, OF DETROIT, MICHIGAN.

REVERSING MECHANISM.

992,157.      Specification of Letters Patent.     Patented May 16, 1911.

Application filed March 15, 1909. Serial No. 483,442.

*To all whom it may concern:*

Be it known that we, ELLSWORTH S. BRYANT and EMIL CEDERSTROM, citizens of the United States of America, residing at Detroit, in the county of Wayne and State of Michigan, have invented certain new and useful Improvements in Reversing Mechanism, of which the following is a specification, reference being had therein to the accompanying drawings.

This invention relates to a reversing mechanism and more especially to certain features thereof whereby any end thrust is balanced, thereby relieving the moving parts of unnecessary friction and reducing the liability of disarrangement common to devices of this class.

The invention consists in the matters hereinafter set forth and more particularly pointed out in the appended claims.

Figure 1:
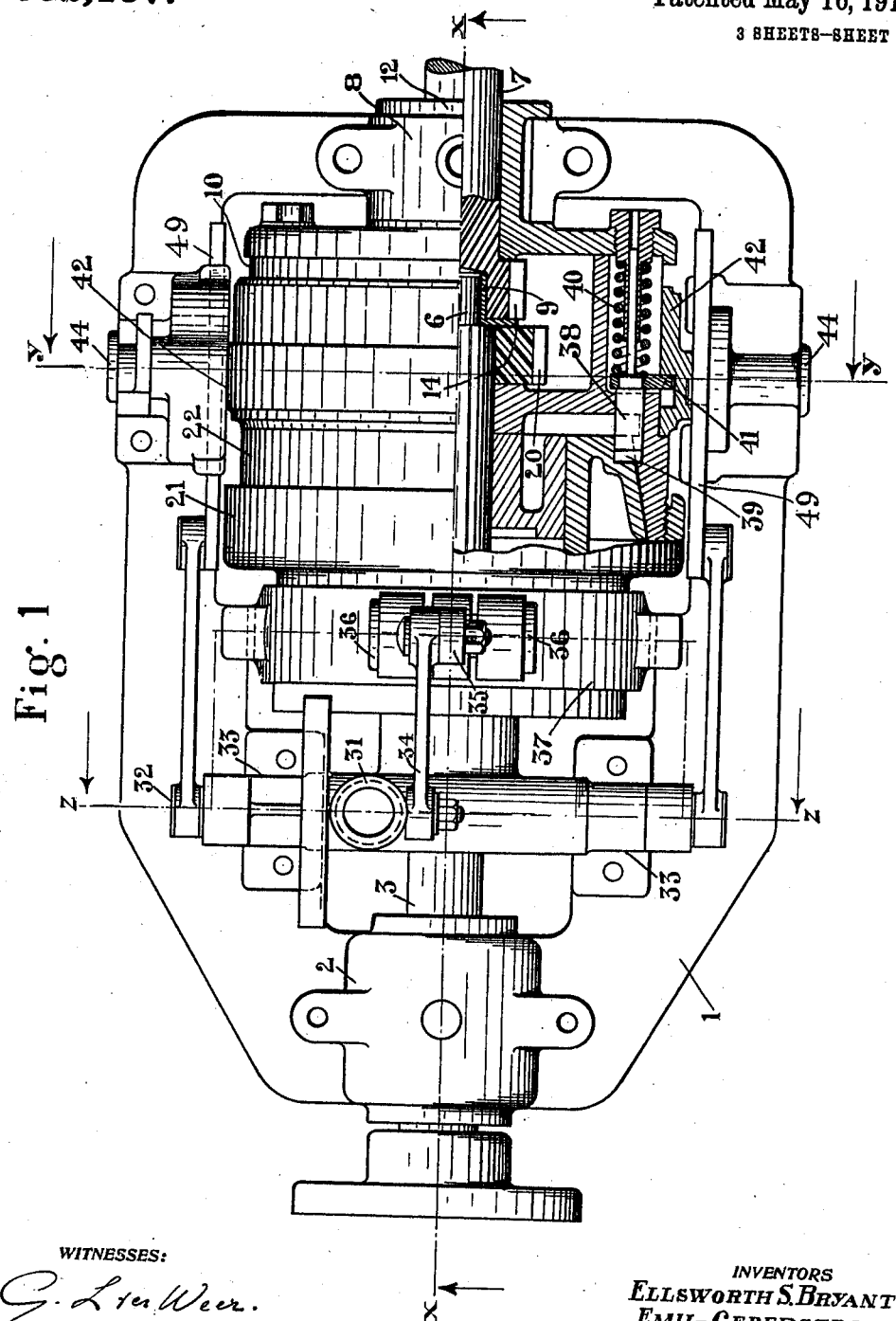
Figure 2:
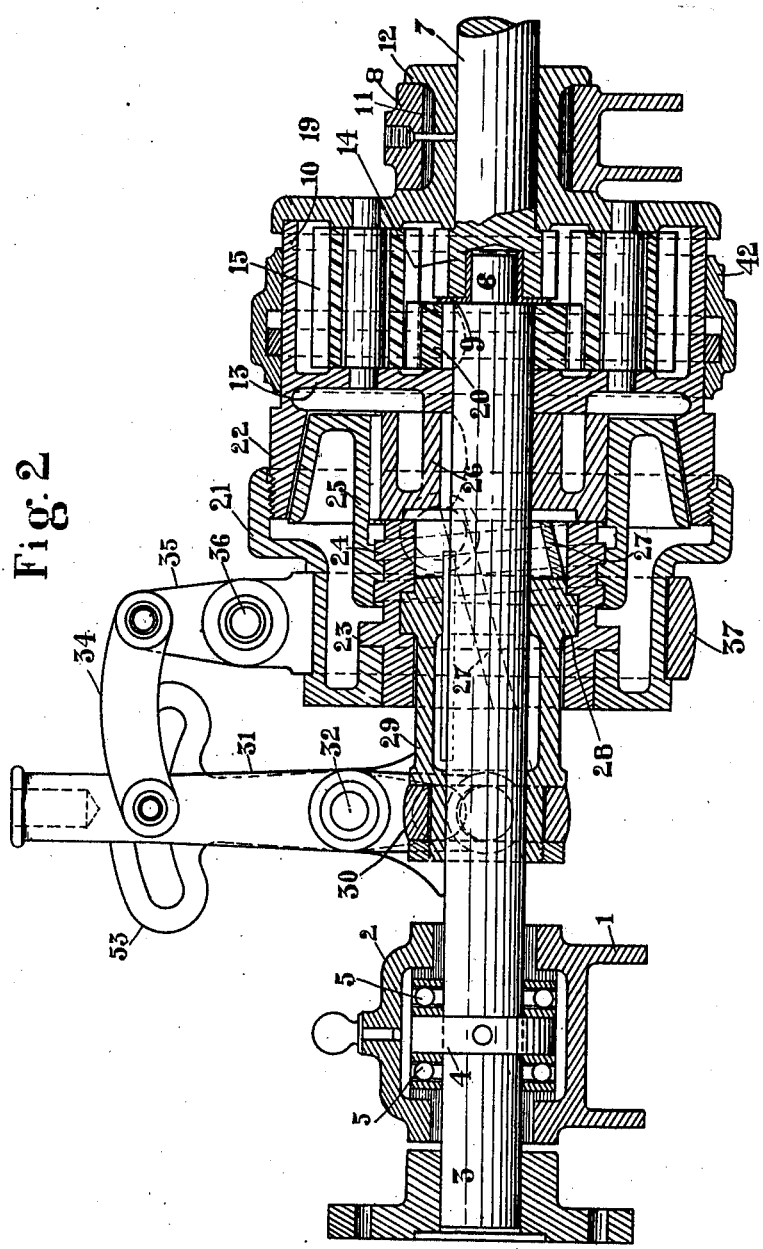

In the drawings, Figure 1 is a plan view partially broken away, and in section, of a mechanism embodying features of the invention. Fig. 2 is a view in section on line $x$—$x$ of Fig. 1, on the oblique plane indicated in Fig. 3. Fig. 3 is a view in section on line $y$—$y$ of Fig. 1. Fig. 4 is a view in section on or about line $z$—$z$ of Fig. 1. Fig. 5 is a view in detail of a positive lock and release apparatus.

Referring to the drawings, a base 1, suitably designed for strength and lightness, has a main bearing 2 in which a driving shaft 3 is journaled, a collar 4 with side friction bearings 5 preventing endwise displacement. A reduced end 6 of the driving shaft is rotatable in the recessed extremity of a follower shaft 7 concentric in a second bearing 8, a bushing 9 being interposed, if desired, between the shafts. A rotatable planetary gear case 10 has a hollow boss or hub 11 journaled in the bearing 8 concentric with the follower shaft 7, a suitable flange 12 retaining it in place. The other head 13 of the casing is loosely journaled on the driving shaft 3. A gear 14 formed or keyed on the follower shaft within the casing meshes with two or more planetary pinions 15 on studs 16 which in turn engage reducing pinions 17 on shafts 19 in the casing, the latter engaging a main gear 20 fast on the end of the main shaft 3. A cylindrical extension 21 is screw-threaded or otherwise secured on a deep flange 22 of the casing and acts as a retainer or keeper for a bushing 23. The latter has outer screw-threads 24 of coarse pitch in engagement with a friction drum cone 25 whose beveled face is adapted to frictionally engage the inner face of the casing flange 22 when the parts are forced together. A barrel 26 keyed on the driving shaft 3, acts as a bearing for the friction drum which is non-rotatably reciprocable thereon and is also an inner stop against which the bushing 23 bears.

Spirally disposed ways 27 on the inner periphery of the bushing engage lugs 28 on a sleeve 29 that is longitudinally reciprocated on the shaft 3 by a yoke 30 forming the lower end of a shifting lever 31 rocking on a cross-shaft 32 in bearings 33 of the main frame. This movement of this sleeve rotates the bushing in relation to the drum 25 and thereby forces them together or apart through the agency of the screw-threads, the outer thrust of the bushing being taken up by the casing extension 21 in opposition to the thrust of the drum 25 against the casing flange 22, thus balancing the pressure and not transmitting it to any fixed end thrust bearing on the shafts themselves. The same movement of the lever 31 that draws the drum 25 away from the casing flange 22 if continued sufficiently operates through a link 34, arm 35 and right and left screw bolt 36 to draw a clamping band 37 taut around the extension 21, and thereby prevent its rotation.

The operation of the device so far as described is that of the conventional type of planetary change gearing, in that release of the casing by both band and drum gives low speed forward movement to the follower shaft, locking the casing by the brake band reverses the follower shaft rotation, and engagement of the casing by the drum gives direct high speed forward rotation, with the addition of the novel features of the counterbalancing of the end thrust. In order to positively lock the shafts to rotate in unison and to prevent possible slippage in high speed work such as automobile and motor boat racing, a plurality of spring-pressed plungers 38 in the inner head of the casing 10 proximate the drum 25, are adapted to enter sockets 39 in the latter if their springs 40 are allowed to project them. In ordinary use, they are held retracted from the drum by their radially extending heads 41 extending through longitudinal slots in the casing into an inner peripheral groove of an annular keeper 42 rotatable and longitudinally reciprocable on the casing 10. The keeper is normally locked against longitudinal movement by a pair of studs 43 eccentrically set on rotatable latch disks 44 journaled in suitable bearings on the main frame at diametrically opposite points of the keeper. One of these disks is locked against rotation with keeper and plungers in retracted position by a trip arm 45 which turns a flattened stud 46 into a locking notch 47 in the disk, and holds the latter fast, a spring 48 encircling the plunger to which it is secured at one end and at the other to the metal in which the plunger is journaled, and normally keeping the trip in this position. When the trip is rocked so that the flattened stud releases the latch disk, the plungers are free to snap forward into the sockets in the drums, carrying the keeper forward. To withdraw the plungers whenever it is desired to release the drum or reverse the mechanism, a pair of slide rods 49 have cams 50 which underrun and lift pins 51 in the latch disks 52 so as to rotate the disks when the rods are moved by the lever 31 as the latter is shifted from high speed, to low speed or reverse position. A quadrant 53 and clamping screw 54 are used to lock the lever in the position required.

In operation, the mechanism may be readily thrown into any of the desired positions, without excessive end thrust and this is the main feature of the invention, the disposition of the parts being such that slight effort on the operator's part locks the friction drum or the casing brake.

An additional feature is the positive lock provided for high speed work, together with the automatic release which prevents accidental stripping of the gears.

Obviously changes in the details of construction may be made without departing from the spirit of the invention and we do not care to limit ourselves to any particular form or arrangement of parts.

What we claim as our invention is:—

1. In a reversing mechanism, a drive shaft, a follower shaft in axial alinement therewith, a casing journaled on the shafts, a planetary gear train therein that is adapted to operatively connect the casing and shafts, a friction drum nonrotatable and longitudinally reciprocable on the drive shaft adapted to frictionally engage the casing when moved toward one end thereof, a bushing rotatably secured in the casing in screw-threaded engagement with the drum, and a sleeve longitudinally reciprocable on the shaft concentric with the bushing adapted to rotate the bushing when moved longitudinally on the shaft.

2. In reversing mechanism, a drive shaft, a follower shaft in axial alinement therewith, a casing journaled on the shafts, a planetary gear train therein that is adapted to operatively connect the casing and shafts, a friction drum non-rotatable and longitudinally reciprocable on the drive shaft adapted to frictionally engage the casing when forced toward one end thereof, a bushing rotatably journaled in the other end of the casing in screw-threaded engagement with the drum, and a longitudinally movable sleeve on the drive shaft concentrically within the bushing provided with lugs engaging spirally disposed ways in the inner periphery of the bushing.

3. In reversing mechanism, a drive shaft, a follower shaft in axial alinement therewith, a casing journaled on the shafts, a planetary gear train in the casing that is adapted to operatively connect the casing and shafts, a friction drum non-rotatable and longitudinally reciprocable on the drive shaft adapted to frictionally engage the casing when forced toward one end thereof, a bushing rotatably journaled in the other end of the casing in screw-threaded engagement with the drum, and a longitudinally movable sleeve on the drive shaft concentrically within the bushing provided with lugs engaging spirally disposed ways in the inner periphery of the bushing.

4. In a reversing mechanism, a drive shaft, a follower shaft in axial alinement therewith, a casing journaled on the shafts, a planetary gear train therein that is adapted to operatively connect the casing and shafts, a friction drum non-rotatable and longitudinally reciprocable on the drive shaft adapted to frictionally engage the casing when moved toward one end thereof, a bushing rotatably secured in the casing in screw-threaded engagement with the drum, a sleeve longitudinally reciprocable on the shaft concentric with the bushing adapted to rotate the bushing when moved longitudinally on the shaft, and a lever for shifting the sleeve.

5. In a reversing mechanism, a drive shaft, a follower shaft in axial alinement therewith, a casing journaled on the shafts, a planetary gear train therein that is adapted to operatively connect the casing and shafts, a friction drum non-rotatable and longitudinally reciprocable on the drive shaft adapted to frictionally engage the casing when moved toward one end thereof, a bushing rotatably secured in the casing in screw-threaded engagement with the drum, a sleeve longitudinally reciprocable on the shaft concentric with the bushing adapted to rotate the bushing when moved longitudinally on the shaft, means for positively locking the drum and casing when frictionally engaged, and means for shifting the sleeve adapted to relese the locking means when the drum is retracted from the casing.

6. In a reversing mechanism, a drive shaft, a follower shaft in axial alinement therewith, a casing journaled on the shafts, a planetary gear train therein that is adapted to operatively connect the casing and shafts, a friction drum non-rotatable and longitudinally reciprocable on the drive shaft adapted to frictionally engage the casing when moved toward one end thereof, a bushing rotatably secured in the casing in screw-threaded engagement with the drum, a sleeve longitudinally reciprocable on the shaft concentric with the bushing adapted to rotate the bushing when moved longitudinally on the shaft, spring plungers in the casing adapted to enter sockets in the friction drum when the latter is engaging the casing, an annular keeper reciprocable on the casing adapted to hold the plungers retracted, latch plates adapted to retain the keeper and plungers in retracted position, a trip arm adapted to lock the parts in retracted position, slide rods adapted to move the latch plates into retracted position, and a lever for shifting the sleeve adapted to move the slide rods into operative relation with the latch disks when it shifts the sleeve into release position.

7. In a reversing mechanism having a drive shaft, a follower shaft, a casing, change speed gearing therein operatively coupling the shafts and casing, a friction drum adapted to engage the casing, a shifting lever operatively coupled to the drum and adapted to move it into engagement with the casing, means for positively locking the drum and casing consisting of an annular keeper shiftable longitudinally on the casing, a pair of oppositely disposed latch disks adapted to reciprocate the keeper, a trip adapted to lock the keeper in retracted position, plungers in the casing secured by the keeper, springs adapted to project the plungers into sockets in the drum when the plunger keeper is released, slide rods each adapted to rotate a latch disk into retracted position, and a connection between the shifting lever and slide rods adapted to move the slide rods into operative relation with the disks when the lever is shifted into release position.

8. In a reversing mechanism, a main frame, a drive shaft journaled therein, a follower shaft journaled therein in axial alinement with the drive shaft, a casing rotatable on the shafts in the main frame, a sleeve longitudinally reciprocable on the drive shaft through one end of the casing, a bushing having an end thrust bearing in said casing end whose inner periphery is provided with spiral ways engaged by lugs on the sleeve, a friction drum non-rotatable and longitudinally reciprocable on the drive shaft having screw-threaded engagement with the bushing, adapted to frictionally engage a flange on the periphery of the casing when the drum is projected toward it by rotation of the bushing, and a planetary gear train operatively connecting the casing and shafts.

9. In a reversing mechanism, a main frame, a drive shaft journaled therein, a follower shaft journaled therein in axial alinement with the drive shaft, a casing rotatable on the shafts in the main frame, a sleeve longitudinally reciprocable on the drive shaft through one end of the casing, a bushing having an end thrust bearing in said casing end whose inner periphery is provided with spiral ways engaged by lugs on the sleeve, a friction drum non-rotatable and longitudinally reciprocable on the drive shaft having screw-threaded engagement with the bushing, the casing periphery being adapted to frictionally engage the drum when the latter is projected toward a flange thereon by rotation of the bushing, a planetary gear train operatively connecting the casing and shafts, means for locking the casing from rotating in the frame, and means for shifting the sleeve longitudinally on the shaft.

10. In a reversing mechanism, a main frame, a drive shaft journaled therein, a follower shaft journaled therein in axial alinement with the drive shaft, a casing rotatable on the shafts in the main frame, a sleeve longitudinally reciprocable on the drive shaft through one end of the casing, a bushing having an end thrust bearing in said casing end whose inner periphery is provided with spiral ways engaged by lugs on the sleeve, a friction drum non-rotatable and longitudinally reciprocable on the drive shaft having screw-threaded engagement with the bushing, the periphery of the casing being adapted to frictionally engage the drum when the latter is projected toward a flange thereon by rotation of the bushing, a planetary gear train operatively connecting the casing and shafts, spring-pressed plungers in the casing parallel to the shafts, adapted when released to enter sockets in the drum, an annular keeper movable longitudinally of the casing to which the plungers are secured, latch disks rotatable in the casing having eccentric studs adapted to shift the keeper when the disks are turned, a trip adapted to hold the keeper in retracted position, a slide rod for each disk having a cam engaging a pin on the disk adapted to turn the disk into retracted position when the rod is advanced, a lever for shifting the sleeve and links connecting the slide rods and lever adapted to advance the rods when the lever, sleeve and bushing retract the drum from the flange.

11. In a reversing mechanism, a main frame, a bearing on one end thereof, a drive shaft rotatable in the bearing secured against endwise movement therein, a follower shaft bearing on the frame axially alined with the drive shaft bearing, a gear casing concentric with the shaft having a hollow boss rotatably secured against endwise movement in the follower shaft bearing, and a peripheral flange adjacent the drive shaft bearing, a follower shaft journaled in the boss, with one end contacting with the adjacent end of the drive shaft, a planetary gear train operatively connecting the casing and shafts, an extension secured on the drive shaft bearing, a rotatable bushing having an end thrust bearing in the outer end of the extension and a screw-threaded periphery, a friction drum non-rotatably reciprocable on the drive shaft in screw-threaded engagement with the bushing, adapted to frictionally engage the flange, a sleeve reciprocable on the drive shaft provided with lugs engaging spiral ways in the inner periphery of the bushing, and means for shifting the sleeve and for locking the casing against rotation in the frame.

12. In a reversing mechanism, a main frame, a bearing on one end thereof, a drive shaft rotatable in the bearing secured against endwise movement therein, a follower shaft bearing on the frame axially alined with the drive shaft bearing, a gear casing concentric with the shaft having a hollow boss rotatably secured against endwise movement in the follower shaft bearing, a follower shaft journaled in the boss with one end contacting with the adjacent end of the drive shaft, a planetary gear train operatively connecting the gears and shafts, the casing having a peripheral flange on the end adjacent the drive shaft bearing, an extension secured thereon, a rotatable bushing having an end thrust bearing in the outer end of the extension and a screw threaded periphery, a friction drum non-rotatably reciprocable on the drive shaft in screw-threaded engagement with the bushing, adapted to frictionally engage the casing flange, a sleeve reciprocable on the drive shaft provided with lugs engaging spiral ways in the inner periphery of the bushing, means for shifting the sleeve and for locking the casing against rotation in the frame, and means for positively locking the drum and casing together adapted to be thrown out of gear by the sleeve shifting means when the latter withdraws the drum from contact with the flange.

13. In a reversing mechanism, a driving shaft, a follower shaft in axial alinement therewith, a casing journaled on the shafts, a planetary gear train adapted to operatively connect the casing and shafts, a friction drum non-rotatable and reciprocable on the drive shaft adapted to frictionally engage the casing when moved toward one end thereof, a rotatable bushing in screw-threaded engagement with the drum having an end thrust bearing against the casing in opposite direction to the thrust of the drum and a member sliding on the drive shaft adapted to rotate the bushing when shifted on the shaft.

In testimony whereof we affix our signatures in presence of two witnesses.

ELLSWORTH S. BRYANT.
EMIL CEDERSTROM.

Witnesses:
C. R. STICKNEY,
OTTO F. BARTHEL.

---

Copies of this patent may be obtained for five cents each, by addressing the "Commissioner of Patents, Washington, D. C."